United States Patent Office 3,135,731
Patented June 2, 1964

3,135,731
MONOAZO DYESTUFFS CONTAINING A MONO-HALOGENATED TRIAZINE RADICAL
Colin George Tilley and Frederick Andrew Waite, both of Manchester, England, assignors to Imperial Chemical Industries Limited, London, England, a corporation of Great Britain
No Drawing. Filed Mar. 5, 1962, Ser. No. 177,213
Claims priority, application Great Britain Mar. 26, 1958
6 Claims. (Cl. 260—153)

This invention relates to new monoazo dyestuffs. More particularly it relates to new monoazo dyestuffs obtained from cyanuric halides, valuable for the production of scarlet colourations on cellulose textile materials fast to wet treatments.

According to the invention there are provided the new monoazo dyestuffs which, in their free acid form, are represented by the formula:

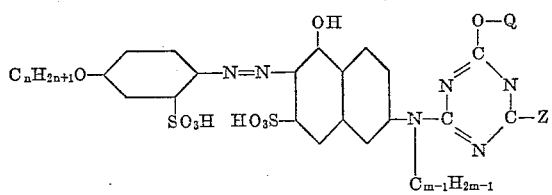

wherein $n$ stands for a small integer, Z stands for a halogen, preferably chlorine, atom, $m$ stands for an integer and Q stands for an alkyl or aryl group. The symbol $n$ in the above formula stands for a small integer, that is to say an integer up to about 4, and preferably stands for 1, so that the group $C_nH_{2n+1}O-$ represents a lower alkoxy, and preferably a methoxy, group.

The symbol $m$ in the above formula preferably represents an integer of from 2 to 5, particularly 2, so that the group $-C_{m-1}H_{2m-1}$ represents an alkyl group of 1 to 4 carbon atoms, preferably the methyl group.

The symbol Q in the above formula may represent an aryl, preferably monocyclic aryl, group such as phenyl, o-, m- or p-methylphenyl or o-, m- or p-methoxyphenyl, but preferably it represents an alkyl group, preferably a lower alkyl group such as ethyl or butyl or above all, a methyl group.

The symbol Z in the above formula may represent, for example, a bromine or, preferably, a chlorine atom.

The invention also provides a process for manufacture of the new monoazo dyestuffs which comprises coupling a diazotised 4-lower alkoxy-2-sulphoaniline with a coupling component represented, in its free acid form, by the formula:

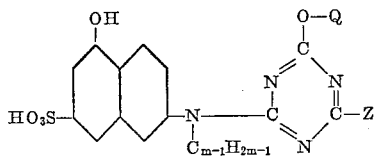

wherein Q, $m$ and Z have the meanings stated above.

As examples of 4-lower alkoxy-2-sulphoanilines whose diazo compounds may be used in the above process, there may be mentioned 4-ethoxyaniline-2-sulphonic acid and 4-methoxyaniline-2-sulphonic acid.

As examples of coupling components which may be used in the above process, there may be mentioned 2-(4'-chloro-6'-methoxy-2'-s-triazinyl)amino-5-naphthol-7-sulphonic acid, 2-N-methyl-N-(4'-chloro-6'-phenoxy-2'-s-triazinyl)amino-5-naphthol-7-sulphonic acid, 2-N-methyl-N-(4'-chloro-6'-methoxy-2'-s-triazinyl)amino-5-naphthol-7-sulphonic acid and 2-(4'-chloro-6'-phenoxy-2'-s-triazinyl)amino-5-naphthol-7-sulphonic acid.

The coupling components used in the process of the invention may be obtained by reacting 2-amino-5-naphthol-7-sulphonic acid or a 2-alkylamino-5-naphthol-7-sulphonic acid with an equimolecular proportion of a 4:6-dihalogeno-s-triazine containing an alkoxy or aryloxy group attached to the carbon atom in 2-position of the triazine ring.

In the process of the invention, the coupling is preferably carried out under slightly acid or neutral conditions and at as low a temperature, preferably below 10° C. as will allow the coupling to take place, so as to minimise side-reactions, in particular the loss, by hydrolysis, of the halogen atom attached to the triazine ring.

The new monoazo dyestuffs may also be obtained by a modification of the above process of the invention wherein a 4:6-dihalogeno-s-triazine containing an alkoxy or aryloxy group attached to the carbon atom in 2-position of the triazine ring (as used as a starting material for the manufacture of the coupling components used in the above process of the invention), is condensed with one molecular proportion of a monoazo compound which, in its free acid form, is represented by the formula:

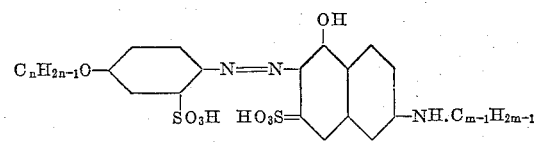

wherein $m$ and $n$ have the meanings given above. This modified process forms a further feature of the invention.

The monoazo compounds of the above formula may be obtained by coupling a diazotised 4-lower alkoxy-2-sulphoaniline either under strongly alkaline conditions with 2-amino-5-naphthol-7-sulphonic acid or a 2-alkyl-amino-5-naphthol-7-sulphonic acid or preferably under weakly acid, neutral or weakly alkaline conditions, with an N-acyl, for example the acetyl, derivative of such a naphthol thereafter removing the acyl group by hydrolysis, for example, by heating with aqueous mineral acid.

This modified process of the invention is advantageously carried out in the presence of an acid-binding agent, preferably an alkali-metal carbonate or bicarbonate. It is carried out under such conditions that the final product still contains a single atom of chlorine or bromine attached to the triazine nucleus, that is to say, for example, in an organic solvent or, preferably, at a relatively low temperature in an aqueous medium. It is usually desirable to add up to about 10% excess of the dihalogeno-s-triazine to allow for its hydrolysis in water and ensure that a full molecular proportion is available for the condensation.

The new monoazo dyestuffs may be isolated from the medium in which they have been formed by the commonly-used techniques, advantageously in the form of an alkali-metal salt, such as the potassium or, preferably, the sodium salt, by salting out and filtration. The filtered dyestuffs may be dried, if desired after the addition of an extender. The drying is preferably carried out at a moderate temperature, that is to say at a temperature between 50° C. and 80° C.

The new monoazo dyestuffs are valuable dyestuffs for cellulose textile materials when applied in conjunction with an acid-binding agent, for example by the process described in British specification No. 797,946, wherein the coloured textile material is aftertreated with an acid-binding agent, or by related processes wherein an acid-binding agent is applied to the textile material before or during the treatment with the dyestuff.

When so applied, the new monoazo dyestuffs give scarlet colourations of good light fastness and very fast to washing, especially to washing treatments in the presence of hypochlorite bleach. In addition these shades are very resistant to change when brought into contact with acid or alkali. Those of the new dyestuffs in which the group —$C_{m-1}H_{2m-1}$ of the formula represents an alkyl group are particularly valuable in that the shades obtained therefrom give very little or no staining of adjacent white cellulose material during washing. They also have an extremely valuable property in that thickened printing pastes containing a relatively high concentration of the dyestuff may be prepared which have little or no tendency to gelatinise. Thus the new dyestuffs enable the textile printer to obtain readily strong scarlet shades which are free from specks. Despite the presence of the reactive halogen in the triazine ring of the dyestuffs, thickened printing pastes containing the new monoazo dyestuffs and an acid-binding agent are remarkably stable and can be stored for long periods. Thus such printing pastes are especially valuable for use in the printing process of the said specification.

The invention is illustrated but not limited by the following examples in which parts are by weight:

*Example 1*

To a suspension of 18 parts of 2-methoxy-4:6-dichloro-s-triazine in 300 parts of water there is added a solution of 28.3 parts (1 molecular proportion) of the sodium salt of 2-methylamino-5-naphthol-7-sulphonic acid in 60° parts of water. The mixture is heated during 45 minutes to a temperature between 45° and 50° C. Sufficient 2 N sodium carbonate solution is added at intervals to keep the mixture faintly acid to litmus. When the 2-methylamino-5-naphthol-7-sulphonic acid has reacted, sufficient 2 N sodium carbonate solution is added to make the mixture neutral to litmus. 40 parts of sodium acetate crystals are then added to the solution and its temperature is reduced to between 5° and 10° C.

To the solution there is then added a suspension of the diazo compound from 20.6 parts (0.95 molecular proportion) of 4-aminophenetole-3-sulphonic acid and the mixture is stirred for 40 hours at a temperature between 5° and 10° C. Sufficient anhydrous sodium carbonate is then added to neutralise the mixture to litmus, followed by sufficient sodium chloride to give a concentration of 150 grams per litre. The precipitated dyestuff is filtered off and dried.

When applied to cotton or viscose rayon by the processes described in British specification No. 797,946, the dyestuff so obtained yields scarlet shades of good fastness to washing.

*Example 2*

A solution of 6.5 parts of 2-phenoxy-4:6-dichloro-s-triazine in 30 parts of acetone is added to 100 parts of water stirring at 20° C. To the suspension so formed, there is added during 15 minutes a solution in 600 parts of water and 12.8 parts of the disodium salt of the aminoazo compound obtained by coupling diazotised 4 - aminoanisole - 3 - sulphonic acid with 2-methyl-N-acetylamino-5-naphthol-7-sulphonic acid and hydrolysing the monoazo compound obtained. The mixture is heated to 30° C. and the temperature is maintained between 30° and 35° C. until all the aminoazo compound has reacted. Salt is then added at the rate of 150 grams for each litre of solution and the precipitated dyestuff is filtered off. The new monoazo dyestuff so obtained, when applied to cellulosic fiibres as described above, gives scarlet shades of good fastness to washing. The following table described further examples of new monoazo dyestuffs of the invention obtained as described in Example 2 from the monoazo compound obtained by coupling a diazo compound from the diazo component of column 1 with the naphthol of column 2, hydrolysing the product obtained and condensing with the triazine of column 3. All give scarlet shades.

| Diazo Component | Naphthol | Triazine |
|---|---|---|
| 4-Aminoanisole-3-sulphonic acid. | 2-N-methyl-N-acetylamino-5-naphthol-7-sulphonic acid. | 2-methoxy-4:6-dichloro-s-triazine. |
| Do. | 2-Acetylamino-5-naphthol-7-sulphonic acid. | Do. |
| Do. | ----do---- | 2-phenoxy-4:6-dichloro-s-triazine. |

This application is a continuation in part of application No. 800,655, filed March 20, 1959, now abandoned.

What we claim is:

1. The monoazo dyestuffs of the formula:

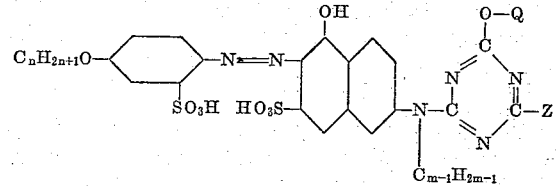

wherein $n$ stands for an integer up to 4, $m$ stands for an integer up to 5, Q stands for a group selected from the class consisting of lower alkyl and phenyl and Z stands for a halogen atom selected from the group consisting of chlorine and bromine.

2. The monoazo dyestuff of the formula:

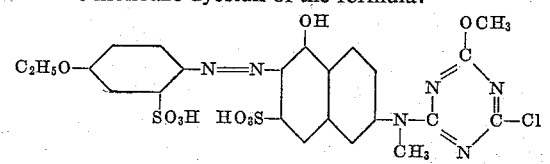

3. The monoazo dyestuff of the formula:

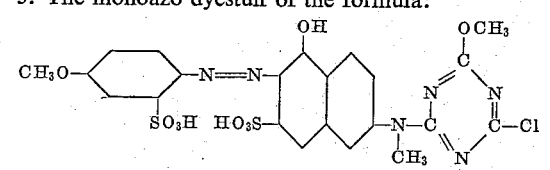

4. The monoazo dyestuff of the formula:

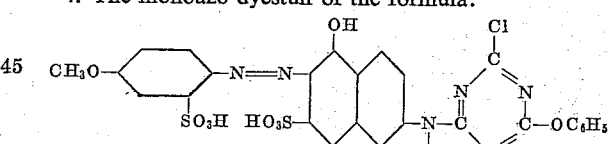

5. The monoazo dyestuff of the formula:

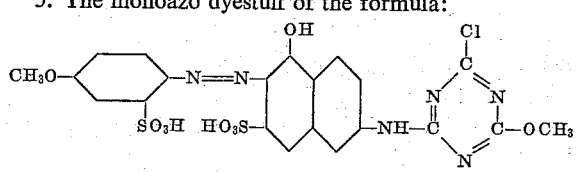

6. The monoazo dyestuff of the formula:

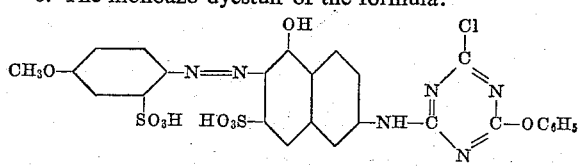

References Cited in the file of this patent

UNITED STATES PATENTS

| | | |
|---|---|---|
| 1,667,312 | Fritzsche et al. | Apr. 24, 1928 |
| 1,886,480 | Haller et al. | Nov. 8, 1932 |
| 2,795,576 | Fasciati | June 11, 1957 |
| 2,891,941 | Fasciati et al. | June 23, 1959 |
| 2,892,828 | Stephen | June 30, 1959 |
| 2,951,837 | Andrew et al. | Sept. 6, 1960 |
| 2,979,498 | Andrew et al. | Apr. 11, 1961 |
| 3,040,022 | Starn | June 19, 1962 |